United States Patent
Dyrbye et al.

(10) Patent No.: US 11,761,465 B2
(45) Date of Patent: Sep. 19, 2023

(54) HYDRAULIC SYSTEM

(71) Applicant: GRUNDFOS HOLDING A/S, Bjerringbro (DK)

(72) Inventors: Karsten Dyrbye, Silkeborg (DK); Kim Hulegaard Jensen, Rød kærsbro (DK); Henrik Kragh, Skørping (DK)

(73) Assignee: GRUNDFOS HOLDING A/S, Bjerringbro (DK)

( * ) Notice: Subject to any disclaimer, the term of this patent is extended or adjusted under 35 U.S.C. 154(b) by 0 days.

(21) Appl. No.: 17/535,319

(22) Filed: Nov. 24, 2021

(65) Prior Publication Data
US 2022/0163056 A1    May 26, 2022

(30) Foreign Application Priority Data

Nov. 25, 2020  (EP) ..................... 20209831

(51) Int. Cl.
*F15B 13/16* (2006.01)
*F15B 21/02* (2006.01)

(52) U.S. Cl.
CPC .............. *F15B 21/02* (2013.01); *F15B 13/16* (2013.01)

(58) Field of Classification Search
CPC .......... G05B 2219/24179; F04B 49/06; F04B 21/02; F15B 13/06
See application file for complete search history.

(56) References Cited

U.S. PATENT DOCUMENTS

| 6,907,331 B2 | 6/2005 | Paquet |
| 2011/0223038 A1 | 9/2011 | Ogawa et al. |
| 2018/0372385 A1 | 12/2018 | Cline |

FOREIGN PATENT DOCUMENTS

EP          3527829 A1    8/2019

*Primary Examiner* — Kenneth Bomberg
*Assistant Examiner* — Daniel S Collins
(74) *Attorney, Agent, or Firm* — McGlew and Tuttle, P.C.

(57) ABSTRACT

A hydraulic system includes at least one hydraulic unit (2) having at least one flow path (14, 16, 18), an hydraulic actuator (22), provided for influencing a hydraulic flow through the flow path (14, 16, 18), at least one sensor device (24, 26), and a control device (10) for controlling the hydraulic actuator (22). The at least one sensor device (24, 26) includes a storage device (32) provided for containing information specifying the hydraulic unit (2). The control device (10) is configured to receive the information stored in the storage device (32) of the sensor device (24, 26) and to set up a control of the hydraulic actuator (22) based on the received information specifying the hydraulic unit (2). A method is provided for controlling the hydraulic actuator.

16 Claims, 1 Drawing Sheet

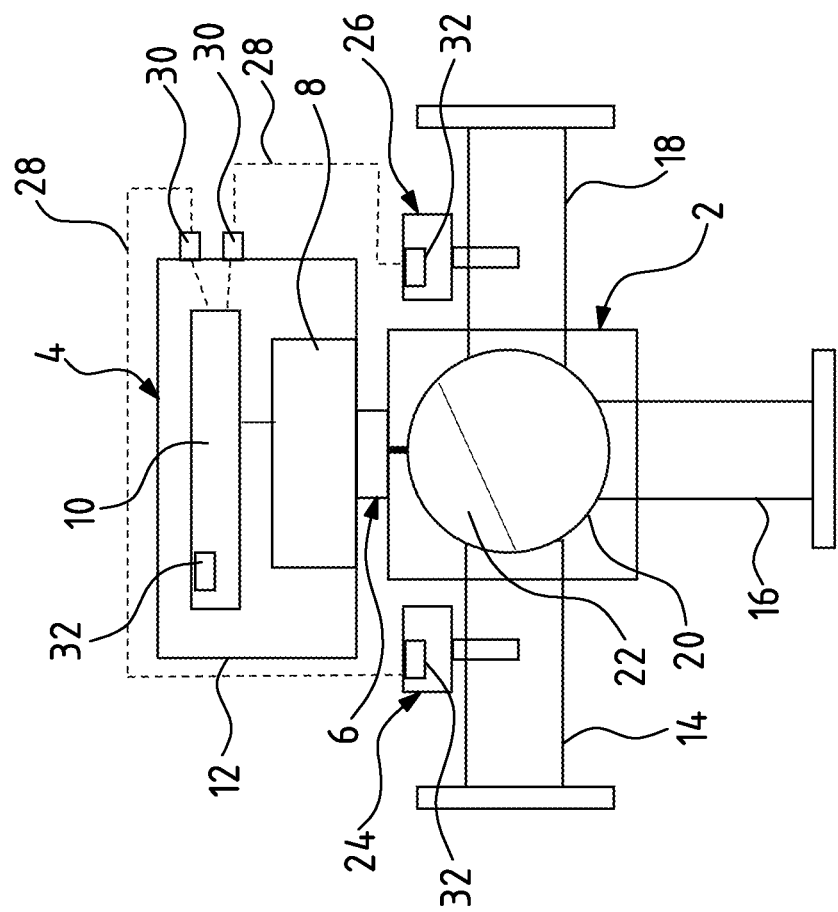

HYDRAULIC SYSTEM

CROSS REFERENCE TO RELATED APPLICATIONS

This application claims the benefit of priority under 35 U.S.C. § 119 of European Application 20209831.5, filed Nov. 25, 2020, the entire contents of which are incorporated herein by reference.

TECHNICAL FIELD

The invention refers to a hydraulic system comprising a hydraulic unit with an actuator and at least one sensor device as well as a control device for controlling the hydraulic actuator.

TECHNICAL BACKGROUND

For example in heating systems of large buildings there are several heating circuits forming a complex hydraulic system consisting of several hydraulic units with hydraulic actuators and associated with control devices for controlling these hydraulic actuators. During installation it is difficult to ensure that the correct control devices are connected with the associated hydraulic units, if the control devices are configured for special hydraulic units. For example the control devices or controllers may be removed from the hydraulic units during installation which simplifies the hydraulic installation of the hydraulic units. When later reconnecting the controllers to the hydraulic units there is the problem that the controllers may be mixed up. Thus, the installer either has to keep track of the single controllers or has to manually set up the controllers after installing them on the hydraulic unit, which is time consuming.

SUMMARY

In view of this it is the object of the invention to provide a hydraulic system offering a simple possibility to verify correct assignment of control devices and hydraulic actuators and allowing a simple set up of the control device for the specific hydraulic unit connected to the control device.

This object is achieved by a hydraulic system and by a method having features according to the invention. Preferred embodiments are described in the following description and shown in the accompanying drawings.

The hydraulic system comprises at least one hydraulic unit. The hydraulic unit defines at least one flow path in its interior and comprises a hydraulic actuator which is provided or configured such to influence a hydraulic flow through said flow path. This means that the hydraulic actuator can in particular vary the volume flow rate and/or change a direction or path of the flow. The actuator may have at least one element inside the flow path for influencing the hydraulic flow, in particular by movement of the actuator or element and/or changing a position of the actuator or element. Furthermore, there is provided at least one sensor device inside the hydraulic unit. The sensor device may for example be a temperature or pressure sensor or any other suitable sensor for detecting parameters or values inside the hydraulic system, preferably characteristic values of a fluid flowing inside the flow path. Furthermore, the hydraulic system comprises a control device provided for controlling the hydraulic actuator. For example the control device may activate or control the actuator to change a position or adjustment of the hydraulic actuator to change the actuator's influence on the hydraulic flow. By this for example the volume flow rate and/or flow direction may be changed.

The sensor device comprises a storage means which contains information specifying the hydraulic unit. By this an identification and/or information about properties of the hydraulic unit can be stored inside the storage means of the sensor device so that a storage means inside the hydraulic unit for identifying or specifying the hydraulic unit is not required. This allows a simple design of the hydraulic unit avoiding additional electronics or elements. Preferably, the hydraulic unit does not contain any electronics. Instead, the electronics of a sensor device is used for identification or specification of the entire hydraulic unit. The control device is configured to receive or to read the information stored in the storage means of said sensor device. The control device, furthermore, is configured to set up or to establish the control of said hydraulic actuator on basis of the information received or read from the sensor device, i.e. the received information specifying the hydraulic unit. For example the control device may choose a set up for control depending on a certain dimension of the hydraulic unit or an intended use of the hydraulic unit which is identified by the specification stored inside the storage means of the sensor device. This allows to use a generic control device for different hydraulic units and allowing to automatically choose the correct set up in the control device depending on the information identifying or specifying the hydraulic unit, which is stored in the storage means of the sensor device. By using the storage means of the sensor device a hydraulic unit does not require any storage means for storing information concerning the required control of the hydraulic unit dependent on the configuration of the hydraulic unit or the specific use of the hydraulic unit. In particular it is possible to store information concerning a mechanical hydraulic unit without further electronics inside another electronic component used in this hydraulic unit as an auxiliary component or a subcomponent. Preferably the sensor device includes a storage means anyway so that an existing storage means of the sensor device can be used to additionally store information specifying the entire hydraulic unit containing such sensor device as one of several components.

Preferably said hydraulic unit comprises at least two sensor devices (the sensor comprises at least two sensor devices) each having a storage means provided for containing information specifying said hydraulic unit. Preferably during set up of the hydraulic system identical information specifying said hydraulic unit are stored in the several sensor devices installed in the hydraulic unit. Thus, preferably there is a redundancy of information specifying the hydraulic unit. This allows an improved verification of the information when connecting the hydraulic unit with a control device. Furthermore, in case that one of the at least two sensors has to be replaced the information specifying the entire hydraulic unit is still available in at least one remaining sensor device inside the hydraulic unit.

According to a further preferred solution the control device comprises storage means provided for containing information specifying the hydraulic unit. Preferably it is the same kind of information specifying the hydraulic unit as stored in the sensor devices which may be stored in a storage means of the control device. This allows to check whether the information stored in the storage means of the control device match with the information stored in the at least one sensor device or preferably in at least two sensor devices. This verification process can be carried out by the control device itself when the sensor devices are connected to the control device. By this verification process it can be asserted whether the correct control device is connected to a certain hydraulic unit which is identified by the information stored in its sensor device or sensor devices.

According to a further embodiment it may be possible to transfer information about the hydraulic unit stored inside the storage means of the control device to the sensor devices so that a sensor device can adjust its functionality to certain hydraulic unit. This is for example helpful if a sensor device is replaced. The new sensor device can configure automatically to the hydraulic unit by receiving required information from the control device and/or a further sensor device.

According to a further possible embodiment of the invention said information specifying said hydraulic unit comprises a unit identifier and/or at least one parameter specifying said hydraulic unit and/or the sensor. The unit identifier may be for example a serial number or a code identifying a certain type of hydraulic unit. A parameter may for example be an information identifying the size of the hydraulic unit or an intended specific use to which the hydraulic unit is adapted.

The hydraulic unit preferably comprises at least two sensors and said control device is configured to set up or start a control on basis of such information specifying said hydraulic unit, which is identically stored in at least two of the two sensor devices and the control device. In case that there are more than two sensors the system may be configured such that the control is set up or started according to the majority of identical information stored in different sensor devices and the control device. In a solution with two sensor devices and a control device the setup is configured on identical information according to a two out of three principle. This means two components, or the majority of the components must show identical information to allow the set up or start of the control and then the control is set up or start on basis of this information being on the majority. The setup of the control means may be a configuration of the control or the selection of a certain control scheme on basis of the information specifying the hydraulic unit, for example the control is adapted to a certain type or dimension of the hydraulic unit which is specified by the information stored in the sensor devices and/or the control device. In a further example the control may be adjusted to a certain type of sensors used in the hydraulic unit or adapted to a specific use of the hydraulic unit which is specified by the information stored in the storage means as described. The set up or adjustment of the control on basis of the described majority principle has the advantage that for example in case that a wrong or unconfigured control device is connected to the hydraulic unit the control device receives the information about the hydraulic unit from the two sensor devices which are installed in the hydraulic unit. Then, in the next step the control device can choose a control scheme or set up its control such that it fits to the kind of hydraulic unit or the intended use of the hydraulic unit connected. In case that a sensor has to be replaced and an unconfigured sensor device is installed in the hydraulic unit the control device can detect that the new sensor device is not configured in the same way as the other sensor device and the control device, since it does not contain the same information specifying the hydraulic unit. In such case the configuration of the new sensor device can be changed and in particular the information specifying the hydraulic unit can be stored inside the storage means of the new sensor device to bring this sensor device in conformity with the other components.

Preferably the control device is configured to change or replace the information in the at least one further device of the at least two sensor devices and the control device which device does not comprise identical information. This means the minority of the devices containing different information is updated such that the information inside their storage means is replaced by the information contained in the storage means of the majority of devices. According to the preferred embodiment the control device is configured to initiate this comparison and replacement of information. However, in an alternative embodiment also the sensor devices may be configured to carry out such comparison and adjustment or replacement of information in its own storage means and/or in the storage means of one or more other components not containing the information according to the majority of components in the system.

Preferably the control device is configured to change the not identical information in the at least one further device to be identical with the information stored in the at least two other devices having identical information. Thus, the information stored in the minority of devices is brought into conformity with the information stored in the majority of devices.

According to a further possible embodiment there is provided a drive means configured or provided for driving said hydraulic actuator. The drive means for example may be a stepper motor or motor driving the actuator. Preferably the drive means is controlled by the control device. In a further possible solution, the drive means and the control device may be arranged in a common drive and control unit, further preferably inside a common housing. The drive and control unit may be designed to be releasable connected to the hydraulic unit containing the actuator. This means that the drive and control unit can be removed from the hydraulic unit for example during installation of the hydraulic unit in the hydraulic system or to replace the drive and control unit for example in case of a defect. However, different arrangements of control device and drive means are possible. For example the drive means may be arranged in the hydraulic unit so that the hydraulic unit and the drive means form an integrated unit and the control device may be a separate device, preferably to be releasable connected to the hydraulic unit.

The arrangement of the drive means and the control device in a single unit has the advantage that the necessary electrical connection can be arranged in a fixed installation inside the unit, preferably inside a single housing and must not be disconnected during installation of the hydraulic unit. In particular in case that the drive means and/or the control device is provided to be connected to the mains voltage this is an advantage, since the required connections for mains voltage can be securely arranged inside a closed housing. Preferably only the sensor device or sensor devices installed in the hydraulic unit have to be connected to the drive and control unit. However, this preferably is done by a low voltage connection or a non-electrical connection.

Preferably said at least one sensor is connected to said control device for signal transmission via a releasable wire connection or by a wireless signal transmission. The releasable wire connection may comprise a plug and socket connection. A wireless signal transmission preferably is provided for an automatically signal coupling between the control device and the sensor device. For example a Bluetooth connection or similar can be used.

The hydraulic actuator may be a pump and/or a valve element, in particular in a flow mixing or dividing valve. One possible application may be a mixing valve used in a heating system to mix two different flows of different temperature wherein the actuator is a valve element adjusting the flow from two inlet ports into an outlet port to adjust the temperature in the outlet port by different mixing ratios of the two inlet flows. In such a mixing valve, temperature sensors a required to detect inlet and outlet temperatures on basis of which the valve element, i.e. the actuator is positioned to achieve a desired outlet temperature. Thus, the mixing valve preferably includes two sensor devices for detecting for example an outlet temperature and at least one inlet temperature. Instead of a mixing valve for example a pump impeller can be used for adjusting a mixing ratio or a volume flow inside the hydraulic unit. For this pressure and/or temperature sensors may be arranged inside the hydraulic unit for controlling the hydraulic actuator.

In a possible embodiment said hydraulic unit comprises at least one inlet connection and one outlet connection for connection of the unit to an external piping. Furthermore, the hydraulic unit may comprise one actuator space containing the hydraulic actuator arranged between said inlet and said outlet connection. The actuator may be a pump or valve element. As described above in case of a mixing valve there may be provided two inlet connections or ports connected to the actuator space.

Said hydraulic unit may comprise a fluid tight coupling configured for coupling said hydraulic actuator to an external drive means. The fluid tight coupling allows to remove the drive means from the hydraulic unit without opening the flow path inside the hydraulic unit. Thus, it is not required to empty the hydraulic unit prior to removing the drive means. Furthermore, this allows an installation of the hydraulic unit by connection to the external piping in a hydraulic system and filling the system prior to attaching the drive means, for example in form of a control and drive unit as described above.

Beside the hydraulic system described above a method for controlling a hydraulic actuator inside a hydraulic unit is subject of the present invention. The method is described in the following. Nevertheless, preferred features and embodiments described above with reference to the hydraulic system shall be regarded as preferred embodiments of the method, too. Preferred features of the system described in the following with reference to the method should also be regarded as preferred embodiments of the hydraulic system as described above.

The method for controlling a hydraulic actuator inside a hydraulic unit uses an external control device for controlling the hydraulic actuator, preferably with a separate drive means connected to the hydraulic actuator. There is arranged at least one sensor device inside the hydraulic unit. According to the method this sensor device is used to store information specifying the entire hydraulic unit. The control of the actuator is set up or configured by the control device on basis of said information stored inside the sensor device. For this the control device receives the information from the sensor device via a suitable data connection. This allows to easily store required information or a specification of a mechanical hydraulic unit inside this hydraulic unit without the need to provide special storage means for such information. Instead, storage means inside an auxiliary component or subcomponent installed inside this hydraulic unit is used to store the information specifying the entire hydraulic unit and not the subcomponent only. This means that the information received from the sensor device is not information specifying the sensor device only, but specifying the entire hydraulic unit containing this sensor device. This allows to keep the required information or specification in the hydraulic unit even in case that a separate control device for the hydraulic unit is removed from the hydraulic unit.

In a preferred embodiment the hydraulic unit comprises at least two sensor devices and these sensor devices and said control device each store information specifying the hydraulic unit. The control device sets up or establishes a control of the hydraulic unit on basis of such information which is identical in at least two of three devices consisting of the two sensor devices and the control device. This means for the set up a majority principle or a two out of three principle, respectively, is used. The control is established or configured on basis of such information which is contained or stored in the majority of devices, for example in both sensors or in one sensor device and the control device. Preferably, in the following the information stored in the minority of devices, containing different information or no information, is replaced by identical information stored in the majority of devices. Further, preferably also the configuration of these devices being in minority is brought into conformity with the other devices to set up the functionality of the entire system.

In the following the invention is described by example with reference to the accompanying FIGURE. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1 is a schematic view of a hydraulic system in form of a mixing device for a heating system.

DESCRIPTION OF PREFERRED EMBODIMENTS

Referring to the drawings, in this example the hydraulic system is a hydraulic device consisting of two main components, namely a hydraulic unit 2 and a control and drive unit 4. The control and drive unit 4 is detachably coupled to the hydraulic unit 2 via a coupling 6 comprising engaging elements on the hydraulic unit 2 and the control and drive unit 4.

The control and drive unit 4 comprises a drive means 8, for example a drive motor, and a control device 10 controlling the drive means 8. In this example the drive means 8 and the control device 10 are arranged in a common housing 12.

The hydraulic unit 2 in this example is a mixing valve having a first inlet port 14 and a second inlet port 16 and an outlet port 18. The two inlet ports 14, 16 and the outlet port 18 are provided to be connected with further components of the hydraulic system, in particular of a heating system. The inlet ports 14, 16 and the outlet port 18 are connected to a valve or actuator space 20 inside which a hydraulic actuator 22 in form of a valve element is arranged. In this example the valve element (hydraulic actuator 22) is ball shaped and movable to vary the opening degree of the first inlet port 14 and the second inlet port 16 towards the outlet port 18. Thus, by changing the position of the hydraulic actuator 22 the ratio of the volume flows through the inlet port 14 and the inlet port 16 can be adjusted, i.e. a mixing ratio of the fluid flow to the outlet port 18 can be varied. The hydraulic actuator 22 is connected to the coupling 16 and can be moved by the drive means 8. On the first inlet port 14 there is arranged a first sensor device 24 and in the outlet port 18 there is arranged a second sensor device 26. In this example the sensor devices 24 and 26 are temperature sensors detecting the temperature of the fluid flow inside the inlet port 14 and the outlet port 18. In the mixing device the first inlet port may for example be connected to a return line of a heating circuit, whereas the outlet port 18 is connected to the supply line of the heating circuit. The second inlet port 16 may be connected to a supply line of the heating system delivering a flow of hot water from a heat source like a boiler.

The sensor devices 24, 26 are connected to the control device 10 via signal lines 28. The signal lines 28 are detachable from the control and drive unit 4 by plug connections 30. Instead of the wired connection the sensor device 24 and 26 may be connected to the control device 10 via a wireless signal transmission, for example using Bluetooth standard or similar.

The sensor devices 24 and 26 comprise electronics having a storage means (storage device) 32 inside the sensor devices 24, 26. Also the control device 10 comprises a storage means (storage device) 32. The storage means 32 are provided to store information specifying the hydraulic unit 2. This information may contain an identifier identifying the hydraulic unit 2 and in particular the type of hydraulic unit 2. Alternatively, or additionally this information may contain parameters defining characteristics and/or specifications of use of the hydraulic unit 2 which are required for the control device 10 to control the actuator inside the hydraulic unit 2 in a desired manner. The information stored in the storage means 32 is required to set up the control, in particular to select a control scheme used by the control device 10 when controlling the hydraulic unit 2 by controlling the drive means 8. For example the control scheme may be specific for a certain size of hydraulic units 2. It may be that the same control and drive unit 4 can be used in connection with different hydraulic units 2, for example of different dimension.

As can be derived from the forgoing description, in this example the hydraulic unit 2 itself is a mechanical unit only, since the drive means 8 and the control device 10 are arranged in a separate control and drive unit 4 which is detachably connected with the hydraulic unit 2. This means that the hydraulic unit 2 does not contain any own electronics which may be suitable to store the required information. The sensor devices 24 and 26 are auxiliary devices or subdevices inside the hydraulic unit 2 and these subdevices are used to store the required information referring to the entire hydraulic unit 2, i.e. which specify the overall hydraulic unit 2, and not the sensor devices 24, 26 only. Thus, according to the invention an electronic component inside a mechanical hydraulic unit is used to store further information going beyond the information referring to the sensor device, namely specifying the mechanical device into which the sensor device is integrated.

In this example there are two sensor devices 24 containing storage means 32. Preferably in all storage means 32 there are stored the same information specifying the hydraulic unit 2. The control device 10 is configured to carry out a verification routine, for example during start of the control device and in particular after being connected to the hydraulic unit 2. During this verification routine it is verified whether all three storage means 32 contain the same information specifying the hydraulic unit 2. If the information stored in all three components is matching or identical, the verification routine for example allows the start of the control on basis of a set up or control scheme relating to the specification of the hydraulic unit 2 stored in the storage means 32. In case that the storage means 32 inside the control device 10 should contain information different to the information contained in the two sensor devices 24 and 26, the setting of the control device 10, i.e. the control scheme or program has to be changed. In this case the control scheme is set to a control scheme or program matching to the information stored in the two sensor devices. Accordingly, the information stored in the storage means 32 of the control device 10 preferably is replaced with identical information stored in the sensor devices 24 and 26 so that finally there is the identical information specifying the hydraulic unit 2 inside all three components. This replacement or change of set up may require a confirmation by a user. This method allows to connect an unspecified control and drive unit 4 with the hydraulic unit 2 ensuring that the control device 10 inside the control and drive unit 4 is configured or reconfigured to the required setting given by the information stored in the storage means 32 of the two sensor devices 24 and 26. This may simplify the installation of different hydraulic devices or systems for example in a large heating system, since it does not matter whether the control and drive units 4 for several hydraulic units 2 are changed or mixed up. Furthermore, a control and drive unit 4 can easily be replaced in case of a fault.

Furthermore, this design allows to easily replace one of the sensor devices 24 and 26. If one of the sensor devices 24 and 26 is replaced the control device 10 preferably starts a verification or set up routine again verifying whether the information stored in all three storage means 32 is the same. In this case likely the storage means 32 of the replaced sensor device does not contain matching information. Thus, the control device 10 detects that one sensor device and the storage means 32 of the control device 10 contain identical or matching information and writes identical information into the storage means 32 of the new sensor device so that again all three elements contain the same information specifying the hydraulic unit 2. This may be done in similar manner with more than three components (sensors and control devices). Furthermore, also the sensor devices 24 and 26 may be configured on basis of the information stored in the storage means 32 or received from the control device 10. For example a measurement range may be set according to this information. Alternatively, it may be possible to use sensors which are able to detect different parameters like pressure and temperature and a configuration may define which values are output by the sensor in a specific system.

While specific embodiments of the invention have been shown and described in detail to illustrate the application of the principles of the invention, it will be understood that the invention may be embodied otherwise without departing from such principles.

REFERENCE NUMERALS

2 hydraulic unit
4 control and drive unit
6 coupling
8 drive means
10 control device
12 housing
14 first inlet port
16 second inlet port
18 outlet port
20 actuator space
22 hydraulic actuator
24 first sensor device
26 second sensor device
28 signal lines
30 plug connection
32 storage means

What is claimed is:

1. A hydraulic system comprising:
a hydraulic unit having at least one flow path and comprising a hydraulic actuator configured to influence a hydraulic flow through said flow path and a sensor device with a storage device containing information specifying the hydraulic unit; and
a control device for controlling the hydraulic actuator, said control device being configured to receive information specifying the hydraulic unit and to set up a control of said hydraulic actuator based on the received information specifying the hydraulic unit, wherein the information specifying the hydraulic unit comprises:
a unit identifier; or
at least one parameter specifying the hydraulic unit; or
at least one parameter specifying the sensor device; or
any combination of a unit identifier, at least one parameter specifying the hydraulic unit, and at least one parameter specifying the sensor.

2. The hydraulic system according to claim 1, wherein said hydraulic unit further comprises another sensor device having another storage device to provide at least two sensor devices each having the storage device provided for containing information specifying said hydraulic unit.

3. The hydraulic system according to claim 1, wherein said control device comprises a further storage means provided for containing information specifying the hydraulic unit.

4. The hydraulic system according to claim 2, wherein:
said control device comprises a further storage means provided for containing information specifying the hydraulic unit; and
said control device is configured to set up the control based on information specifying said hydraulic unit which is identically stored in at least two of the further storage means and the two sensor devices.

5. The hydraulic system according to claim 4, wherein said control device is configured to change the information in one of the further storage means and the two sensor devices, which does not comprise the information specifying said hydraulic unit which is identically stored in the at least two of the further storage means and the two sensor devices.

6. The hydraulic system according to claim 5, wherein said control device is configured such that the change in the information in one of the further storage means and the two sensor devices comprises changing not identical information to the information specifying said hydraulic unit which is identically stored in the at least two of the further storage means and the two sensor devices.

7. The hydraulic system according to claim 1, further comprising a drive means configured to drive said hydraulic actuator.

8. The hydraulic system according to claim 1, wherein said control device is detachably connected to the hydraulic unit.

9. The hydraulic system according to claim 1, wherein said sensor device is connected to said control device for signal transmission via a releasable wire connection or by a wireless signal transmission configuration.

10. The hydraulic system according to claim 1, wherein said hydraulic actuator comprises a pump, or a valve element or a pump and a valve element.

11. The hydraulic system according to claim 1, wherein said hydraulic unit comprises:
an inlet connection;
an outlet connection configured to connect the hydraulic unit to external piping; and
an actuator space containing the hydraulic actuator arranged between said inlet connection and said outlet connection.

12. The hydraulic system according to claim h wherein said hydraulic unit comprises a fluid tight coupling configured to couple said hydraulic actuator to an external drive means.

13. A method for controlling a hydraulic actuator inside a hydraulic unit via an external control device, the method comprising:
storing information specifying the hydraulic unit with a storage device connected to at least one sensor device inside the hydraulic unit; and
controlling the hydraulic actuator by the control device, wherein the control is set up based on the information specifying the hydraulic unit, wherein:
at least another sensor device is provided with the hydraulic unit to provide at least two sensor devices with the hydraulic unit;
the at least another sensor device and the control device each store information specifying a hydraulic unit; and
the control provided by the control device is set up based on information which is identical in at least two of three devices consisting of the two sensor devices and the control device.

14. A hydraulic system comprising:
a hydraulic unit having at least one flow path and comprising a hydraulic actuator configured to influence a hydraulic flow through said flow path and a sensor device with a storage device containing information specifying the hydraulic unit; and
a control device for controlling the hydraulic actuator, said control device being configured to receive information specifying the hydraulic unit and to set up a control of said hydraulic actuator based on the received information specifying the hydraulic unit, the hydraulic unit further comprising another sensor device having another storage device to provide at least two sensor devices each having the storage device provided for containing information specifying said hydraulic unit, the control device comprising a further storage means provided for containing information specifying the hydraulic unit, the control device being configured to set up the control based on information specifying the hydraulic unit which is identically stored in at least two of the further storage means and the two sensor devices.

15. The hydraulic system according to claim 14, wherein the control device is configured to change the information in one of the further storage means and the two sensor devices, which does not comprise the information specifying said hydraulic unit which is identically stored in the at least two of the further storage means and the two sensor devices.

16. The hydraulic system according to claim 15, wherein the control device is configured such that the change in the information in one of the further storage means and the two sensor devices comprises changing not identical information to the information specifying said hydraulic unit which is identically stored in the at least two of the further storage means and the two sensor devices.

* * * * *